(12) United States Patent
Gu et al.

(10) Patent No.: US 7,572,403 B2
(45) Date of Patent: Aug. 11, 2009

(54) MULTISOURCE AND MULTIMATERIAL FREEFORM FABRICATION

(76) Inventors: Peihua Gu, c/o Suite 130, 3553 - 31 Street NW., Calgary, Alberta (CA) T2L 2K7; Valerio Giuliani, c/o Suite 130, 3553 - 31 Street NW., Calgary, Alberta (CA) T2L 2K7

(*) Notice: Subject to any disclaimer, the term of this patent is extended or adjusted under 35 U.S.C. 154(b) by 756 days.

(21) Appl. No.: 10/934,427

(22) Filed: Sep. 7, 2004

(65) Prior Publication Data

US 2005/0104257 A1     May 19, 2005

Related U.S. Application Data

(60) Provisional application No. 60/481,328, filed on Sep. 4, 2003.

(51) Int. Cl.
*B29C 35/04*     (2006.01)

(52) U.S. Cl. ............... 264/308; 264/255; 264/401; 425/174.4; 700/118; 700/119; 700/200; 156/64; 156/356; 156/379.9; 156/380.9

(58) Field of Classification Search ............ 264/255, 264/308, 401; 425/174.4; 700/118, 119, 700/200; 156/64, 356, 379.9, 380.9
See application file for complete search history.

(56) References Cited

U.S. PATENT DOCUMENTS

| | | | |
|---|---|---|---|
| 5,134,569 A * | 7/1992 | Masters | 700/182 |
| 5,238,639 A * | 8/1993 | Vinson et al. | 264/401 |
| 5,837,960 A | 11/1998 | Lewis et al. | 219/121.63 |
| 6,046,426 A | 4/2000 | Jeantette et al. | 219/121.63 |
| 6,129,872 A * | 10/2000 | Jang | 264/75 |
| 6,143,378 A | 11/2000 | Harwell et al. | 427/597 |
| 6,153,034 A | 11/2000 | Lipsker | 156/73.1 |
| 6,214,279 B1 | 4/2001 | Yang et al. | 264/482 |
| 6,238,614 B1 | 5/2001 | Yang et al. | 264/497 |
| 6,269,540 B1 | 8/2001 | Islam et al. | 29/889.7 |
| 6,405,095 B1 | 6/2002 | Jang et al. | 700/118 |

* cited by examiner

*Primary Examiner*—George R Koch, III
(74) *Attorney, Agent, or Firm*—Anthony R. Lambert

(57) ABSTRACT

An apparatus for forming freeform solid articles includes a head unit having a plurality of arc-shaped support arms. The support arms mount material feeders and power sources which are directed at a work table. The material feeders, power sources and movement of the head unit and work table are controlled by a computerized control system.

19 Claims, 4 Drawing Sheets

MULTISOURCE AND MULTIMATERIAL FREEFORM FABRICATION

CROSS REFERENCE TO RELATED APPLICATIONS

This application claims the priority benefit of U.S. Provisional Application No. 60/481,328 filed on Sep. 4, 2003 entitled "Multisource and Multimaterial Freeform Fabrication", the contents of which are incorporated herein by reference.

BACKGROUND OF INVENTION

The present invention relates to an apparatus and method for fabricating freeform solid shapes using multiple materials and multiple sources.

Rapid prototyping technologies are known which incorporate solid freeform fabrication processes and machines. Such systems build an object layer by layer or point by point under the control of a computer. Typically, a computer-aided design (CAD) file which represents a desired object is sliced into a large number of thin layers, with the contours of each layer being defined to form vectors or polylines. Computer numerical control (CNC) methods are then used to drive a fabrication tool for building the object layer by layer.

Rapid prototyping has found a broad range of applications such as verifying CAD databases, evaluating design feasibility, testing part functionality, assessing aesthetic considerations or ergonomic considerations, creating conceptual models and sales or marketing tools and providing small production runs.

In U.S. Pat. No. 5,121,329, a fused deposition modeling system is disclosed which utilizes a heated nozzle to melt and extrude a nylon wire or a wax rod. The nozzle is moved and controlled by a computer system in accordance with sliced CAD data. This process requires preparation of a raw material into a flexible filament or rigid rod and is unable to utilize high-melting point materials such as metals or ceramics. Other fused deposition modelling systems use particulate compositions dispersed in a binder. The binder is later burned off and the remaining particles are sintered or densified by metal impregnation.

Ballistic particle modelling processes fabricate objects by spraying liquid resin droplets. The resin droplets may be sprayed through an inkjet print head with droplet sizes in the range of 30 to 50 microns. Obviously, high part accuracy may be obtained but only at very slow build rates.

Welding type systems are known where a wire is deposited on a substrate and melted by directed laser energy. The wire is driven from a spool through a nozzle which is controlled by a computer system. In other systems, molten metal is deposited onto a surface by a combination of a moveable electrode and weld torch.

Existing rapid prototyping systems are unable to effectively combine different materials and different sources to create functionally graded compositions or locally controlled properties. Therefore, there is a need in the art for a freeform solid fabrication system which utilizes multiple sources and multiple materials.

SUMMARY OF INVENTION

The present invention comprises a freeform solid fabrication system which may utilize multiple sources and multiple materials. In one aspect, the invention may comprise An apparatus for fabricating three-dimensional objects comprising:

(a) at least two different material feeders selected from the group consisting of i. a powder dispensing feeder; ii. a liquid dispensing feeder; iii. a wire feeder;

(b) a worktable;

(c) a head unit for receiving the at least two different materials and dispensing the materials onto the worktable, the head unit comprising at least one power source and at least one support arm wherein the power source is mounted to and slidably moveable along the at least one support arm; and, (d) control means for controlling movement of the worktable and head unit, application of the at least two different material feeders, and application of the power source.

Preferably, the at least one support arm is arched such that the power source is directed at the worktable throughout its range of motion along the support arm. There may be a plurality of support arms and one, some or all of the at least one powder dispensing feeder, the at least one liquid dispensing feeder and the at least one wire feeder are slidably mounted on a support arm.

In another aspect, the invention may comprise a method of fabricating a freeform three-dimensional object, comprising the steps of: (a) providing at least two different materials from a powder material source, a liquid material source or a wire material source; (b) controlling the at least two material sources to deliver predetermined quantities of material at predetermined times or intervals to a worktable; (c) directing a power source to the worktable to combine the at least two material sources to fabricate the object.

BRIEF DESCRIPTION OF DRAWINGS

The invention will now be described by way of an exemplary embodiment with reference to the accompanying simplified, diagrammatic, not-to-scale drawings.

DETAILED DESCRIPTION

The present invention provides for an apparatus for fabricating a freeform three-dimensional object. When describing the present invention, all terms not defined herein have their common art-recognized meanings.

Figure 1:
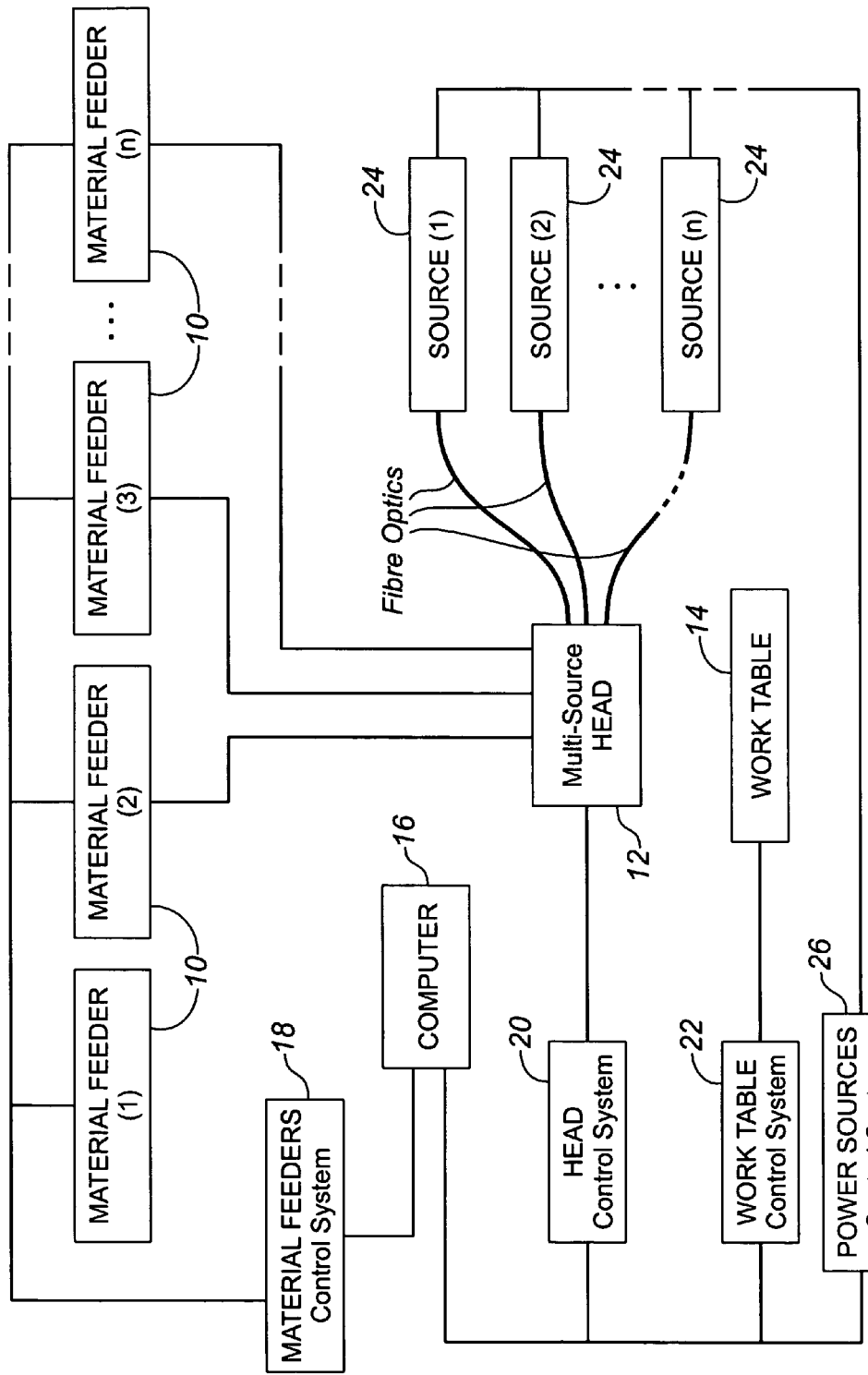
FIG. 1 is a schematic representation of one embodiment of the present invention.

As shown schematically in FIG. 1, a system of the present invention comprises a plurality of material feeders (10) and a head unit (12). The head unit deposits the material onto a work table (14). The control of the material feeders (10), the head unit (12) and the work table (14) is accomplished by a computer (16) operating suitable control modules (18, 20, 22). Multiple energy or power sources (24) are associated with the head unit (14) and controlled by a power source control module (26), which itself is associated with the computer (16). When describing the present invention, the planar area below the head unit represented by the work table is defined by X-axis and Y-axis, which is typically but not necessarily horizontal, while the Z-axis is normal to the X-Y plane and extends vertically up through the head unit from the work table.

Figure 2:
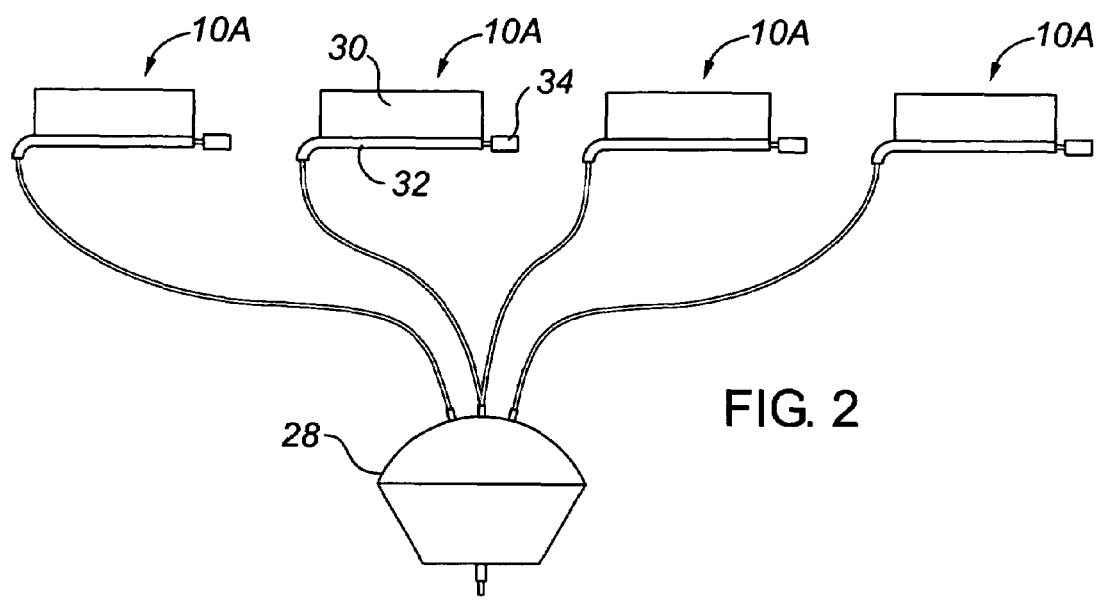
FIG. 2 shows multiple powder feeders converging into a mixing chamber.
Figure 3:
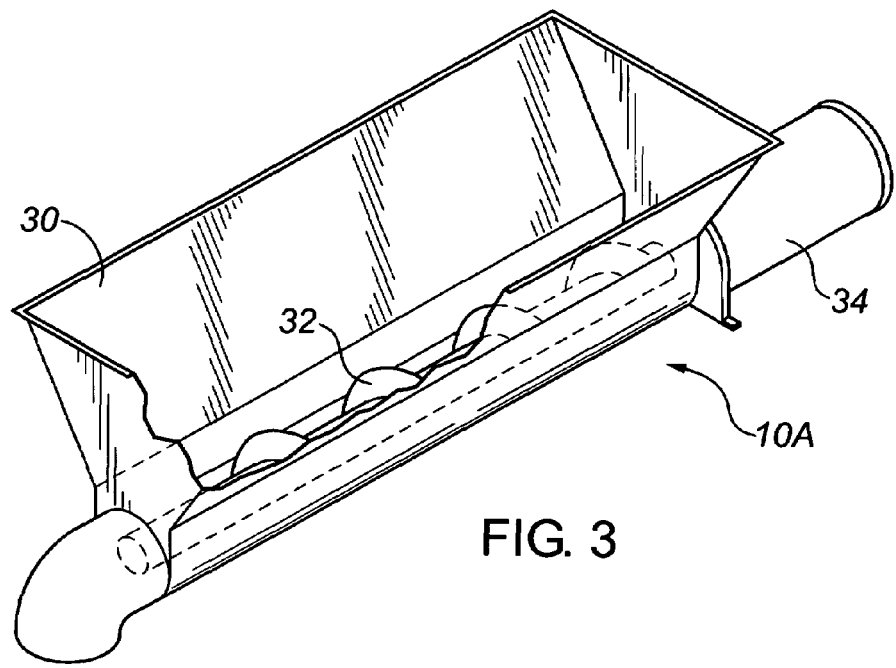
FIG. 3 is a view of a single powder feeder.

In one embodiment, the material feeders comprise three different types of material feeders as shown schematically in FIG. 2. A first material feeder (10A) comprises a plurality of powder feeders for delivering a solid particulate material to a mixing chamber (28). In one embodiment, as shown in FIG. 3, a powder feeder (10A) comprises a hopper or bin (30) and a feed screw (32) which is disposed below the hopper or at the bottom of the bin. The screw is driven by an electrical motor (34) to drive powder within the hopper. The electric motor (34) is connected to and controlled by the control system (18) which controls the timing and quantity of powder delivery from the powder feeder. Each hopper may be filled with a different powder to create mixed compositions within the mixing chamber. A mixing rotor (not shown) may be provided in the mixing chamber (28).

Figure 4:
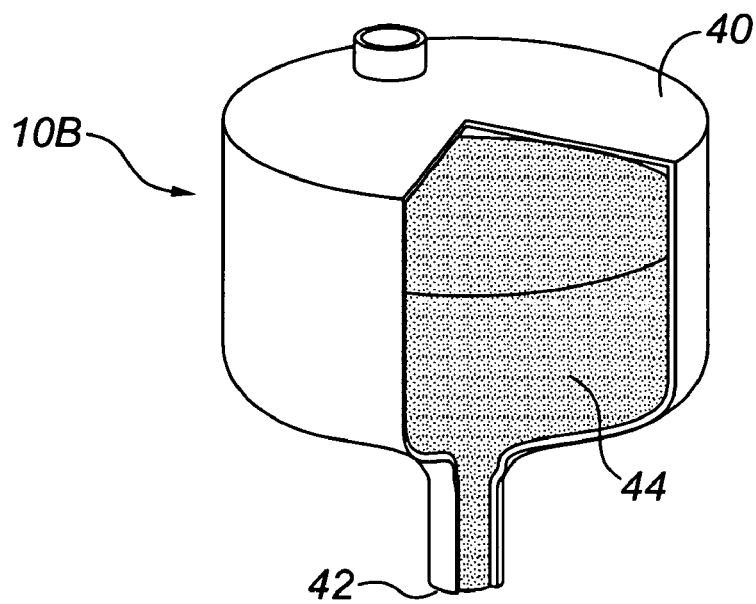
FIG. 4 is a view of a single liquid feeder.

FIG. 4 illustrates a liquid delivery feeder (10B) which comprises a fluid tank (40) and a control valve (42). The tank may hold liquid polymers or resins (44) and connects to a liquid mixing tank (not shown) by means of appropriate pipes or tubing.

Figure 5A:
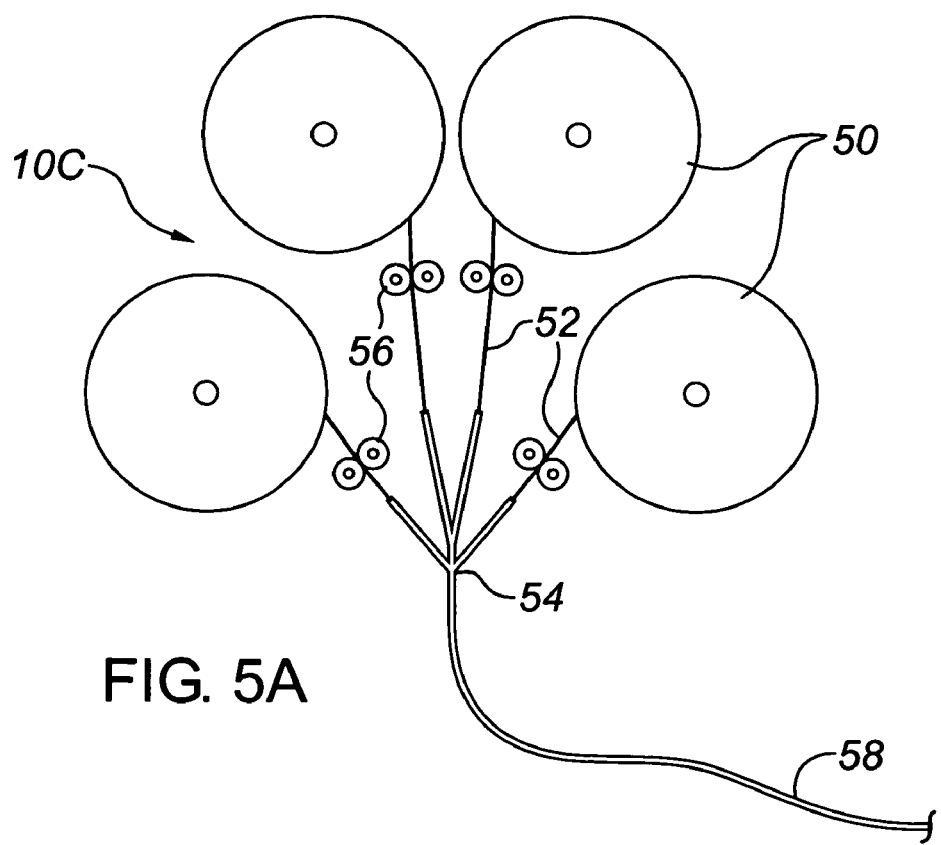
FIG. 5A is a view of a first portion of a multiple wire feeder.
Figure 5B:
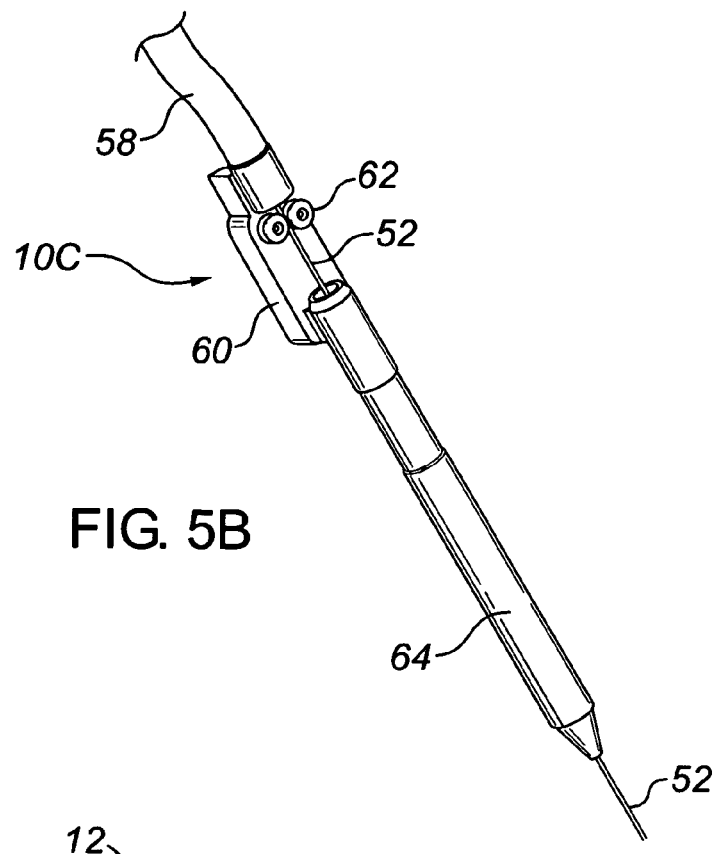
FIG. 5B is a view of a second portion of a wire feeder.

FIG. 5A illustrates one portion of a wire feeder (10C). In one embodiment, a plurality of wire spools (50) feed wire (52) into a collector (54) by means of counter-rotating drive wheels (56). The collector then leads to a flexible pipe (58) or tubing which directs the wire to a second portion of the wire feeder as shown in FIG. 5B. The second portion is positioned closer to the head unit and receives the wire from the flexible pipe (58). An electric motor (60) actuates a pair of drive wheels (62) which feeds the wire through the wire dispenser (64). The wire used may be a filament or multifilament of any suitable material such as plastic, metal or ceramic material.

The invention includes the combination of two different material feeders, such as a powder feeder and a liquid feeder. Preferably, the invention comprises at least one powder feeder, at least one liquid feeder and at least one wire feeder.

Figure 6:
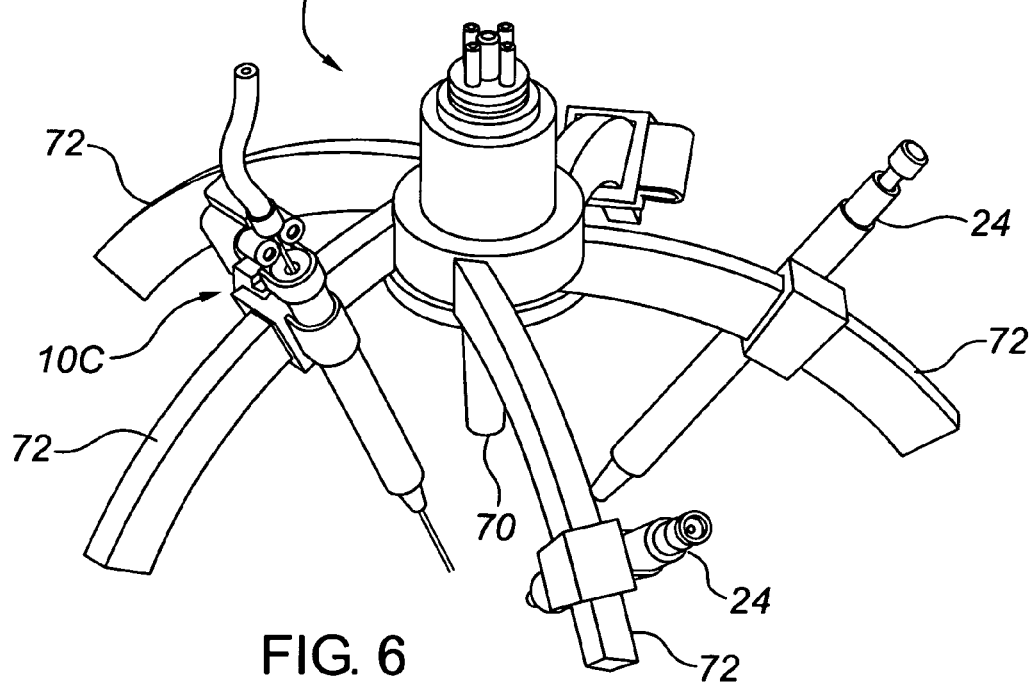
FIG. 6 is a view of a head unit.

The head unit is shown in FIG. 6 including a central nozzle (70) assembly and a plurality of arched support arms (72). The support arms are preferably curved such that an elongate implement mounted perpendicularly on the support arm may be moved laterally along the support arm yet remain aimed at substantially the same location on the workspace. In other words, in one embodiment, the support arm defines an arc which has a center point on the work table. In one embodiment, the power sources (24) are mounted to the support arms and directed at the workspace immediately below the nozzle (70). Preferably, each of the power sources may be moved along its own longitudinal axis, closer to or away from the workspace, as well as laterally along the support arm (72).

The power sources may the same or different and may include a laser source, or multiple laser sources of differing intensities or wavelengths, infrared or ultraviolet lamps or other power sources. However, the present invention is not intended to be limited to a particular energy or power source. The power source (24) must produce energy sufficient to melt or otherwise alter the material being deposited onto the work table.

Preferably, the nozzle (70) assembly includes at least two different channels, one each for the powder feeder or feeders and the liquid feeder or feeders. A single channel may be connected to a single feeder or a mixing chamber which draws from two or more feeders. The nozzle assembly may move along the Z-axis to facilitate material deposition. The wire feeder (64) may be mounted on a support arm (72) as shown in FIG. 6 or may form part of or be associated with the nozzle assembly.

In operation, the computer implemented control system contains digital information about the desired object to be manufactured, including its three-dimensional shape and composition. The composition may vary in different locations or regions of the object. One skilled in the art will appreciate that in order to manufacture an object of a specific shape, movement of the head unit which includes the nozzle and the wire dispenser relative to the work table must be controlled. As well, the amount and composition of the material being delivered from the head unit must be controlled combined with actuation of the power source(s). Synchronized control of these various elements of the apparatus requires a robust control system. However, the control algorithms necessary are well known, may be available commercially, and are well within the ordinary skill of one skilled in the art of system automation.

In use, the work table (14) is positioned immediately below the nozzle (70) of the head unit. The materials may be deposited onto the work table layer by layer. In a preferred embodiment, the work table itself may be moveable in all three X, Y and Z-axes. More preferably, the work table may be moveable in all three directions with six degrees of freedom. Of course it is unnecessary that both the head unit (12) and the work table (14) be moveable. In one embodiment, the head unit (12) is fixed in position while the work table (14) is moveable under control of the control system.

The control system may use well known CAD methods for creating a three-dimensional object file and slicing the CAD data as well as well-known computer numerical control (CNC) methods for controlling the fabrication process. Computer numeric control is the control of a machine tool using text strings to represent specific motions and actions. It is a system in which programmed numeric values are directly inserted and stored on some form of input medium, and automatically read and decoded to cause a corresponding movement in the machine which it is controlling.

As may be seen, the use of multiple materials which may be precisely controlled, along with multiple power sources, allows for the manufacture of objects having functionally graded compositions or locally controlled properties.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

The invention claimed is:

1. An apparatus for fabricating three-dimensional objects comprising:
    (a) at least two different material feeders selected from the group consisting of i. a powder dispensing feeder; ii. a liquid dispensing feeder; iii. a wire feeder;
    (b) a worktable;
    (c) a head unit for receiving the at least two different materials and dispensing the materials onto the worktable, the head unit comprising at least one power source and at least one arched support arm wherein the power source is mounted to and slidably moveable along the at least one arched support arm, the arched support arm being curved and having a focal point with center on the work table and the arched support arm being oriented so that the at least one power source is directed at the worktable throughout its range of motion along the arched support arm; and (d) control means for controlling movement of the worktable and head unit, application of the at least two different material feeders, and application of the power source.

2. The apparatus of claim 1 wherein the head unit comprises a plurality of arched support arms and at least one material feeder is slidably mounted on an arched support arm.

3. The apparatus of claim 1 wherein the powder dispensing feeder comprises a hopper and feed screw.

4. The apparatus of claim 1 wherein the liquid dispensing feeder comprises a liquid holding tank and control valve.

5. The apparatus of claim 1 wherein the wire feeder comprises a wire reel and means for advancing the wire to the head unit.

6. The apparatus of claim 5 wherein the means for advancing the wire comprises a pair of counter-rotating drive wheels.

7. The apparatus of claim 1 wherein the head unit comprises a central nozzle and each support arm has a focal point with center on the worktable.

8. The apparatus of claim 7 wherein the central nozzle is perpendicular to the worktable.

9. The apparatus of claim 7 in which the focal point of the at least one arched support arm lies on an axis defined by the central nozzle.

10. The apparatus of claim 1 wherein the at least one power source may comprise a laser, ultraviolet lamp, or infrared lamp.

11. The apparatus of claim 10 comprising a plurality of power sources.

12. The apparatus of claim 11 in which the plurality of power sources comprise at least two different types of power sources.

13. The apparatus of claim 1 wherein the control means comprises a computer-numerical control system.

14. The method of claim 13 wherein the object comprises different regions and different proportions of material or different materials are used in different regions of the object.

15. The apparatus of claim 1 comprising at least one powder dispensing feeder, at least one liquid dispensing feeder, and at least one wire feeder.

16. The apparatus of claim 1 in which the head unit comprises a central nozzle and in which the at least one arched support arm is rotatably mounted on the head unit and the at least one arched support arm is rotatable around an axis defined by the central nozzle.

17. A method of fabricating a freeform three-dimensional object, comprising the steps of:
(a) providing at least two different materials from a powder material source, a liquid material source or a wire material source;

(b) controlling the at least two material sources to deliver predetermined quantities of material at predetermined times or intervals to a worktable;

(c) directing a power source to the worktable to combine the at least two material sources to fabricate the object, the power source being curved and having a focal point with center on the work table; and wherein the object is fabricated in functionally graded layers.

18. An apparatus for fabricating three-dimensional objects comprising:
(a) a material feeder selected from the group consisting of i. a powder dispensing feeder; ii. a liquid dispensing feeder; iii. a wire feeder;
(b) a worktable;
(c) a head unit for receiving materials and dispensing the materials onto the worktable, the head unit comprising a power source and a plurality of support arms wherein the power source is mounted to and slidably moveable along a first support arm, the material feeder is mounted to and slidably moveable along a second support arm, the support arms being rotatable around an axis defined by the head unit and the plurality of support arms, at least the first support arm being an arched support arm that is curved and has a focal point centered on the worktable, the focal point lying on the axis defined by the head unit; and
(d) control means for controlling movement of the worktable and head unit, application of the material feeder, and application of the power source.

19. An apparatus for fabricating three-dimensional objects comprising:
(a) a material feeder selected from the group consisting of i. a powder dispensing feeder; ii. a liquid dispensing feeder; iii. a wire feeder;
(b) a worktable;
(c) a head unit for receiving materials and dispensing the materials onto the worktable, the head unit comprising a central nozzle defining an axis, a power source and a plurality of support arms wherein the power source is mounted to and slidably moveable along a first support arm, the material feeder is connected to the central nozzle, the support arms being rotatable around an axis defined by the head unit and the plurality of support arms, at least the first support arm being an arched support arm that is curved and has a focal point centered on the worktable, the focal point lying on the axis defined by the central nozzle; and
(d) control means for controlling movement of the worktable and head unit, application of the material feeder, and application of the power source.

* * * * *